US010606754B2

(12) United States Patent
Goldberg et al.

(10) Patent No.: US 10,606,754 B2
(45) Date of Patent: Mar. 31, 2020

(54) LOADING A PRE-FETCH CACHE USING A LOGICAL VOLUME MAPPING

(75) Inventors: Itzhack Goldberg, Mount Carmel (IL); Stephen Alfred Haley, Austin, TX (US); Moriel Lechtman, Mount Carmel (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 164 days.

(21) Appl. No.: 13/448,104

(22) Filed: Apr. 16, 2012

(65) Prior Publication Data

US 2013/0275679 A1    Oct. 17, 2013

(51) Int. Cl.
*G06F 12/08* (2016.01)
*G06F 12/0866* (2016.01)
*G06F 12/0862* (2016.01)
*G06F 12/00* (2006.01)

(52) U.S. Cl.
CPC .......... *G06F 12/0866* (2013.01); *G06F 12/00* (2013.01); *G06F 12/0862* (2013.01)

(58) Field of Classification Search
CPC ........................ G06F 12/0866; G06F 12/0862
USPC ...................................................... 711/1–200
See application file for complete search history.

(56) References Cited

U.S. PATENT DOCUMENTS

| | | | | |
|---|---|---|---|---|
| 7,281,106 B1 * | 10/2007 | Arnan | | G06F 3/061 |
| | | | | 711/112 |
| 7,636,801 B1 * | 12/2009 | Kekre et al. | | 710/31 |
| 2003/0126343 A1 * | 7/2003 | Olarig | | G06F 12/0607 |
| | | | | 710/306 |
| 2007/0180206 A1 * | 8/2007 | Craft | | G06F 11/1433 |
| | | | | 711/162 |
| 2007/0276990 A1 * | 11/2007 | Mosek | | G06F 12/0862 |
| | | | | 711/103 |
| 2010/0088481 A1 | 4/2010 | Kaushik et al. | | |
| 2010/0241807 A1 * | 9/2010 | Wu et al. | | 711/118 |
| 2011/0125797 A1 | 5/2011 | Nasre et al. | | |

(Continued)

FOREIGN PATENT DOCUMENTS

| CN | 101203019 B | 1/2011 |
|---|---|---|
| CN | 101976182 A | 2/2011 |

(Continued)

OTHER PUBLICATIONS

Nsabagwa, Mary et al., "Improving iSCSI Memory Cache Hit through Prefetching to a Striped Disk", 2010.

*Primary Examiner* — David Yi
*Assistant Examiner* — Zubair Ahmed
(74) *Attorney, Agent, or Firm* — Griffiths & Seaton PLLC

(57) ABSTRACT

Methods, apparatus and computer program products implement embodiments of the present invention that include receiving a storage command from a host computer to retrieve first data from a specific physical region of a storage device, and responsively retrieving second data from one or more additional physical regions of the storage device based on a logical mapping managed by the host computer. The second data is conveyed to a cache. In some embodiments, the logical mapping is received from the host computer prior to receiving the storage command. In alternative embodiments, the logical mapping is retrieved from the storage device prior to receiving the storage command.

7 Claims, 3 Drawing Sheets

(56) References Cited

U.S. PATENT DOCUMENTS

2012/0084516 A1\* 4/2012 Iwuchukwu ........ H04L 67/2847
        711/144
2012/0089781 A1  4/2012 Ranade et al.
2012/0278560 A1\* 11/2012 Benzion ............. G06F 12/0873
        711/137

FOREIGN PATENT DOCUMENTS

EP      0452019 A2   10/1991
JP    2004110218 A    4/2004

\* cited by examiner

US 10,606,754 B2

LOADING A PRE-FETCH CACHE USING A LOGICAL VOLUME MAPPING

FIELD OF THE INVENTION

The present invention relates generally to data storage, and specifically to loading a pre-fetch cache based on a logical volume mapping.

BACKGROUND

In computer storage systems (also referred to herein as storage subsystems), disk partitioning and logical volume management are used to manage physical storage devices such as hard disk drives. In disk partitioning, a single storage device is divided into multiple logical storage units referred to as partitions, thereby treating one physical storage device as if it were multiple disks. Logical volume management provides a method of allocating space on mass-storage devices that is more flexible than conventional partitioning schemes. In particular, a volume manager can concatenate, stripe together or otherwise combine regions (a region is a sequence of bytes having a specific length, typically one megabyte) into larger virtual regions that administrators can re-size or move, potentially without interrupting system use.

To manage a given volume, a volume map that defines the relationship between a given logical volume's regions and physical regions (also known as blocks) on the physical storage device. For example, International Business Machines' (IBM) Advanced Interactive eXecutive™ (AIX™) operating system typically stores the volume map in a Volume Group Descriptor Area (VGDA). The VGDA is typically stored at the beginning of each physical storage device, and contains information that describes the relationship (i.e., mapping) between the volumes and the physical storage devices of an AIX™ system. In operation, an AIX™ system can read the VGDA from the physical storage device, and determine what physical storage devices and logical volumes are available to the system.

SUMMARY

There is provided, in accordance with an embodiment of the present invention a method, including receiving a storage command from a host computer to retrieve first data from a specific physical region of a storage device, responsively retrieving second data from one or more additional physical regions of the storage device based on a logical mapping managed by the host computer, and conveying the second data to a cache.

In some embodiments, the method includes receiving the logical mapping from the host computer prior to receiving the storage command.

In alternative embodiments, the method includes retrieving the logical mapping from the storage device prior to receiving the storage command.

There is also provided, in accordance with an embodiment of the present invention an apparatus, including a storage device, and a processor configured to receive a storage command from a host computer to retrieve first data from a specific physical region of the storage device, to responsively retrieve second data from one or more additional physical regions of the storage device based on a logical mapping managed by the host computer, and to convey the second data to a cache.

There is further provided, in accordance with an embodiment of the present invention a computer program product, the computer program product including a non-transitory computer readable storage medium having computer readable program code embodied therewith, the computer readable program code including computer readable program code configured to receive a storage command from a host computer to retrieve first data from a specific physical region of a storage device, computer readable program code configured to responsively retrieve second data from one or more additional physical regions of the storage device based on a logical mapping managed by the host computer, and computer readable program code configured to convey the second data to a cache.

There is additionally provided, in accordance with an embodiment of the present invention a method, including receiving a storage command from a host computer to retrieve data from a first region of a logical volume, identifying, a corresponding second region on one of multiple storage devices, the second region corresponding to the first region based on a logical mapping managed by the host computer, retrieving the data from the second region, and conveying the data to the host computer.

BRIEF DESCRIPTION OF THE DRAWINGS

The disclosure is herein described, by way of example only, with reference to the accompanying drawings, wherein.

DETAILED DESCRIPTION OF EMBODIMENTS

OVERVIEW

When processing read requests, a computer storage system (e.g., clustered storage controllers) implements pre-fetch cache (also referred to herein as a cache) in order to increase performance. A pre-fetch cache typically comprises high-speed memory that is configured to store data that the computer system anticipates will be requested in the near future. For example, if a storage system receives a request to retrieve data from a specific physical region of a storage device, in addition to processing the retrieval request, the computer system may also retrieve physical regions on the storage device that follow the specific region, and load the retrieved physical regions to the pre-fetch cache.

In some embodiments the retrieved physical regions may comprise physical regions that adjacently follow the specific physical region. For example, the sixth and the seventh physical regions adjacently follow the fifth physical region. If the storage system then receives a request to retrieve additional data from one of the physical regions that are stored in the pre-fetch cache, the storage system can convey the data directly from the pre-fetch cache (i.e., from high-speed memory), instead of retrieving the data from the slower storage device.

Embodiments of the present invention provide methods and systems for utilizing a volume map to determine which physical regions to load to the pre-fetch cache. In some embodiments, the storage system initially receives the volume map defining a relationship between a logical volume and one or more physical storage devices.

Upon receiving a request to retrieve first data from a specific region of one of the storage devices, the storage system processes the retrieval request, and may consult the volume map to determine a given logical region that corresponds to the specific physical region. The storage system can then identify additional physical regions that correspond to logical regions that adjacently follow the given logical region, and load data from the identified physical regions to the pre-fetch cache.

Embodiments of the present invention help improve data retrieval performance of computer systems processing data retrieval requests from logical volumes that are spread across multiple physical storage devices. Instead of loading data from the physical regions that adjacently follow a requested specific physical region, embodiments of the present invention can use the received volume map to choose which physical regions to load to the pre-fetch cache.

System Description

Figure 1:
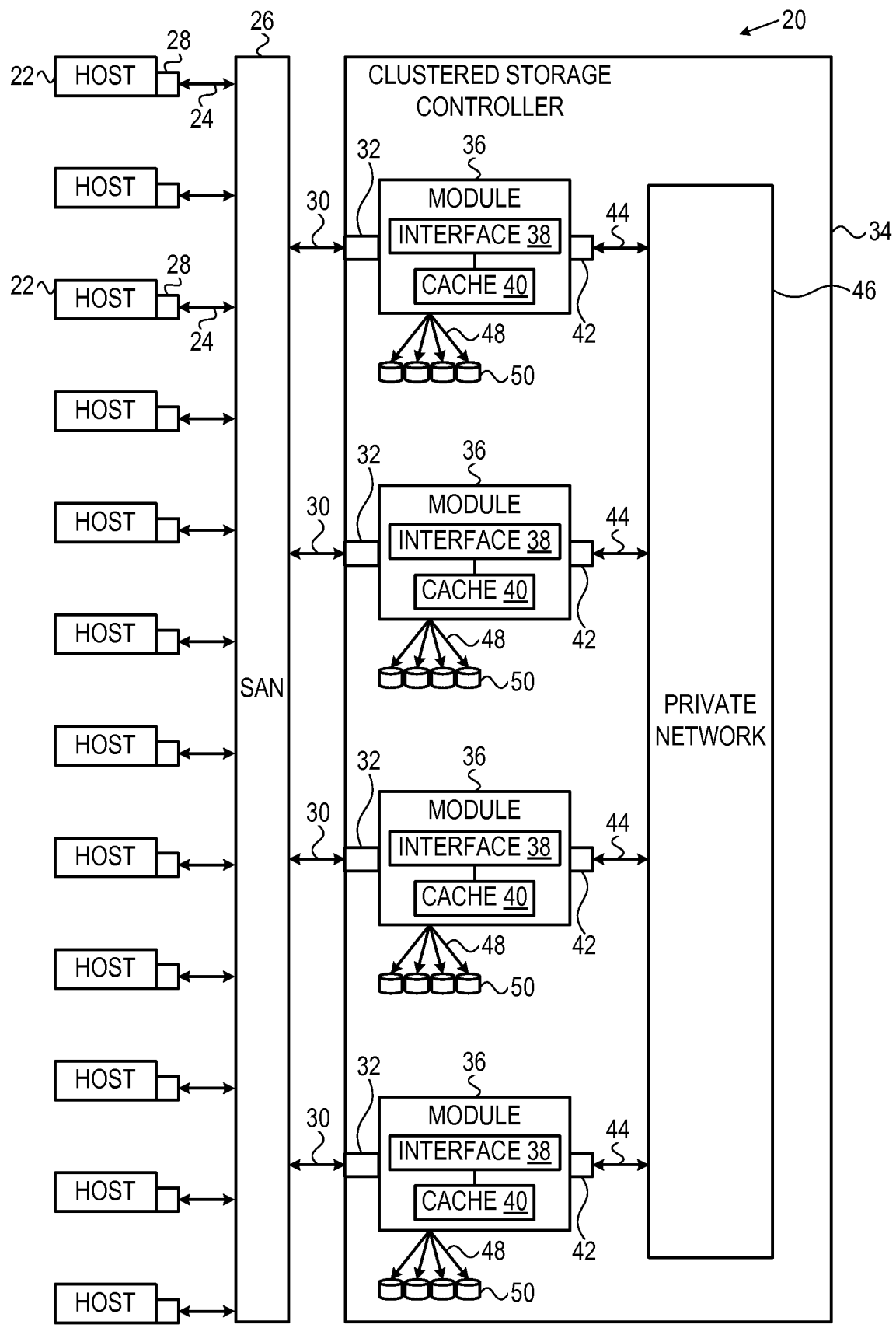
FIG. 1 is a schematic pictorial illustration of a storage system, in accordance with an embodiment of the present invention.

FIG. 1 is a schematic pictorial illustration of a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1000 through 1019 of a logical volume. Storage subsystem 20 may operate in, or as, a network attached storage (NAS) or a SAN system.

Storage subsystem 20 comprises a clustered storage controller 34 coupled between SAN 26 and a private network 46 using data connections 30 and 44, respectively, and incorporating adapters 32 and 42, again respectively. Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Routing records, indicating the association of logical addresses of logical volumes with partitions and the association of the partitions with the caches, are distributed by SAN 26 to one or more generally similar network interfaces 38 of storage modules 36. It will be understood that storage subsystem 20, and thus clustered storage controller 34, may comprise any convenient number of network interfaces 38. Subsequent to the formation of storage devices 50, network interfaces 38 may receive I/O commands from host computers 22 specifying logical addresses of storage devices 50. The network interfaces use the routing records to break the commands into I/O instructions, or command subsets, that are then distributed among caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be directly coupled to storage modules 36.

Data having contiguous logical addresses are generally distributed among storage devices 50. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
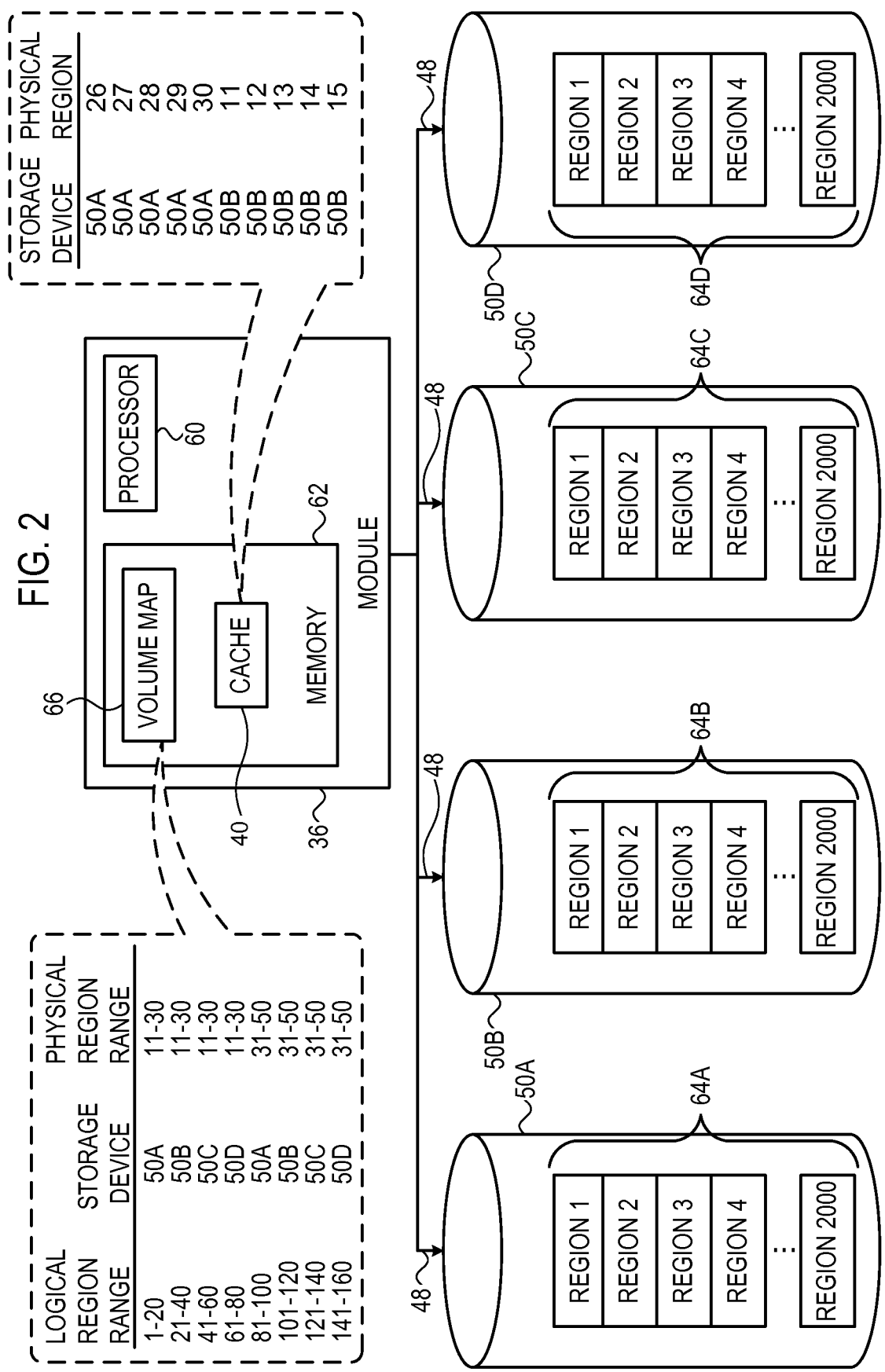
FIG. 2 is a schematic pictorial illustration of a module of the storage system configured to load a cache based on a logical volume mapping, in accordance with an embodiment of the present invention.

FIG. 2 is a schematic pictorial illustration of module 36 configured to load a cache 40 based on a logical volume mapping of storage devices 50, in accordance with an embodiment of the present invention. In the description herein, storage devices 50 may be differentiated by appending a letter to the identifying numeral, so that storage devices 50 comprise storage devices 50A, 50B, 50C and 50D.

Module 36 comprises a processor 60 and a memory 62. Storage devices 50A, 50B, 50C and 50D each comprise a plurality of physical regions 64A, 64B, 64C and 64D, respectively. In the embodiments described herein, local regions 64A, 64B, 64C and 64D are also referred to as physical regions 64.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Memory 62 is configured to store a volume map 66 (also referred to herein as a logical mapping or a logical volume mapping) and cache 40. In some embodiments, cache 40 comprises a pre-fetch cache. Volume map 66 may be owned and managed by a given host computer 22, and defines a logical one-to-one mapping between logical regions of a given logical volume and their corresponding physical regions 64 on storage devices 50. In the example shown in FIG. 2, if an application executing on a given host computer 22 requests to read logical regions 40 and 41 from the given volume, then the given host computer conveys a read request to clustered storage controller 34 to read the thirtieth region 64B from storage device 50B and the eleventh region 64C from storage device 50C.

Processor 60 is configured to receive and execute storage commands, such as Small Computer System Interface (SCSI) commands. Examples of SCSI commands received by processor 60 include:

| Code | Command | Description |
|---|---|---|
| 00 | Test Unit Ready | Determine if a device is ready to transfer data. |
| 03 | Request Sense | Obtain error information from a device. |
| 04 | Format Unit | Destructively format a device. |
| 08 | Read | Read data from a device. |
| 0A | Write | Write data to a device. |

In operation, processor 60 receives a storage command (e.g., SCSI command code 08) from host computers 22 to retrieve first data from a first region 64. As explained in detail hereinbelow, in addition to retrieving the first data from the first physical region, processor 60 is configured to utilize volume map 66 to identify additional logical regions that adjacently follow the first region, to retrieve second data from one or more second physical regions 64 that correspond to the additional logical regions, and to convey the second data to cache 40. In the example shown in the figure, logical region 21 adjacently follows logical region 20. Logical region 20 is associated with physical region 30 on storage device 50A, and logical region 21 is associated with physical region 11 on storage device 50B.

Processor 60 may comprise a general-purpose computer, which is programmed in software to carry out the functions described herein. The software may be downloaded to module 36 in electronic form, over a network, for example, or it may be provided on non-transitory tangible media, such as optical, magnetic or electronic memory media. Alternatively, some or all of the functions of processor 60 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Cache Loading Using a Volume Map

Figure 3:
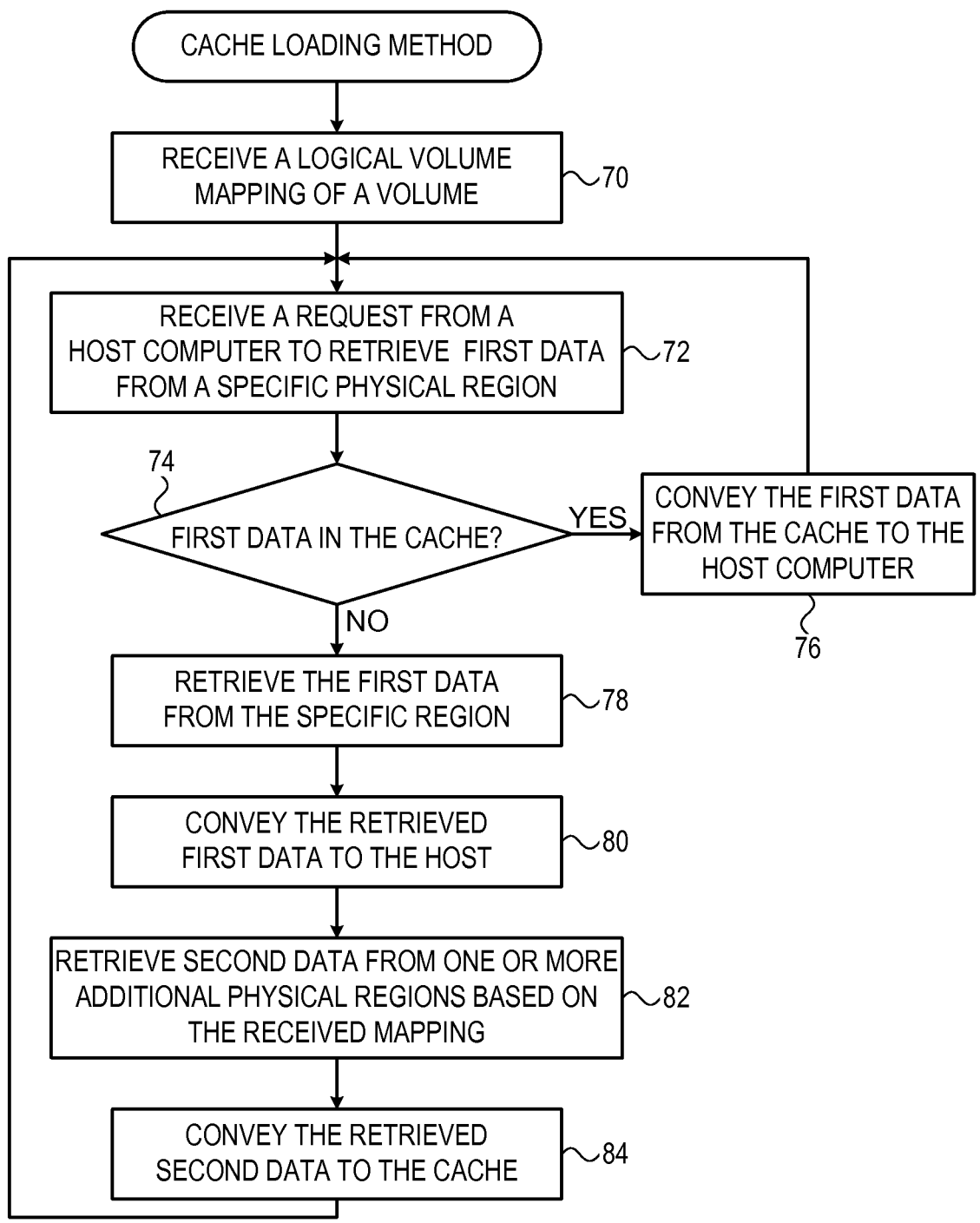
FIG. 3 is a flow diagram that schematically illustrates a method of loading the cache based on the volume mapping, in accordance with a first embodiment of the present invention.

FIG. 3 is a flow diagram that schematically illustrates a method of loading cache 40 based on volume map 66, in accordance with an embodiment of the present invention. In an initialization step 70, processor 60 receives volume map 66 from a given host computer 22, and stores the volume map to memory 62. As discussed supra, volume map 66 may be owned and managed by a given host computer 22, and defines relationships between logical regions of a given volume and corresponding regions 64 of storage devices 50. In the example shown in FIG. 1, the given volume comprises 160 regions that are "striped" across storage devices 50A, 50B, 50C and 50D.

In an alternative embodiment, processor 60 can retrieve volume map 66 from one of storage devices 50. As described supra, if host computers 22 are executing IBM's AIX™ operating system, then volume map 66 may be stored in the VGDA of storage devices 50.

In a receiving step 72, processor 60 receives, from a given host computer 22, a storage command comprising a request to retrieve first data from a specific physical region 64. In a comparison step 74, if the first data is already stored in cache 40, then processor 60 retrieves the first data from the cache, conveys the first data to the given host computer 22 in a first conveying step 76, and the method continues with step 72.

Returning to step 74, if the requested first data is not stored in cache 40, then in a first retrieval step 78, processor 60 retrieves the first data from the specific physical region 64, and conveys the retrieved first data to the given host computer 22 in a second conveying step 80.

In response to the received storage command, processor 60 identifies, in volume map 66, a given logical region associated with the requested specific physical region 64, and then identifies additional physical partitions 64 that are associated with corresponding logical regions that follow the given logical region. In some embodiments, the corresponding local regions comprise logical regions that adjacently follow the given logical region associated with physical region 64 (see the example described hereinbelow). In an alternative embodiment, the corresponding local regions comprise logical regions that follow but are not adjacent to the given logical region associated with physical region 64. In other words, processor 60 may use various read-ahead algorithms to identify the additional physical regions to load to cache 40, including but not limited to algorithms that identify adjacent logical regions, as described supra.

In a second retrieval step 82, processor 60 retrieves second data from one or more additional physical partitions 64 based the relationships stored in volume map 66. In a third conveying step 82, processor 60 conveys the retrieved second data to cache 40, and the method continues with step 72.

In some embodiments processor 60 may periodically receive an updated volume map 66, in order to update volume map 66. For example, there may be instances when physical regions 64 are either added or deleted from a given logical volume. Therefore processor 60 may execute a background process (also known as a daemon) that periodically checks to see if there are any updates to volume relationships (e.g., the VGDA described supra) for the storage devices.

As an example, assume processor 60 (FIG. 2) receives a request in the receiving step to retrieve the first data from the twenty-fifth physical region 64A on storage device 50A, and cache 40 is configured to store data from ten physical partitions 64. Therefore, in the third conveying step described supra, processor 60 first reads volume map 66 to determine which additional physical regions 64 are to be loaded into the cache. Continuing the example, the ten additional physical regions to be retrieved and loaded to cache 40 comprise the physical regions 26-30 on storage device 50A and the physical regions 11-15 on storage device 50B.

As described supra, each storage device 50 may comprise a physical storage device such as a disk drive or a logical storage device such as a LUN (where the LUN comprises multiple physical storage devices). In some embodiments, processor 60 can use volume map 66 to combine the multiple LUNs into a single logical LUN. In other words, each storage device 50 may comprise a single physical storage device (e.g., a disk drive), a logical storage device comprising multiple physical storage devices (e.g., a LUN), or a logical storage device that combines multiple (smaller) logical and/or physical storage devices into a single (and larger) logical storage device. For example, storage device 50A may comprise a logical storage device that comprises multiple LUNs, and volume map 66 can store a logical mapping between regions of storage device 50A and corresponding regions of the multiple LUNs.

In operation, processor 60 receives, from a given host computer 22, a storage command comprising a request to retrieve data from a first region of a logical volume whose mapping information is stored in volume map 66. Using volume map 66, processor 60 identifies a second region on a given storage device 50 that corresponds to the first region, retrieves the data from the second region, and conveys the data to the given host computer. Note that both the first region and the second region may comprise "logical regions". The first region may comprise a region of a logical volume, and the second region may comprise a region of a logical storage device (e.g., a LUN comprising multiple storage devices such as disk drives).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
receiving a storage command from a host computer to retrieve first data from a specific physical region of a storage device comprising a logical storage device having multiple logical unit numbers (LUNs) and multiple physical storage devices;
responsively retrieving second data being non-contiguous data from one or more additional physical regions of the multiple LUNs of an additional one of the multiple physical storage devices, physically non-adjacent to the first data such that the one or more additional physical regions are retrieved from a different physical storage device and partition than that storing the first data; wherein the first and second data are distributed on the multiple physical storage devices using block interleaving such that the first data and the second data each comprise the non-contiguous data; wherein the specific physical region and the one or more additional physical regions are combined into virtual regions, each of the virtual regions including a plurality of regions each comprising a sequence of bytes of a specific length of one megabyte, and each of the plurality of regions distributed among the multiple physical storage devices and previously concatenated or striped together to form a respective virtual region, and wherein the second data is responsively retrieved based on a logical mapping managed by the storage device and received prior to the storage command by the host computer, by:
referencing the logical mapping, the logical mapping comprising relationships between logical regions of a logical volume and their corresponding physical regions; wherein the logical mapping contains a mapping of ranges of the logical regions which correspond to ranges of the physical regions and an indication of which of the multiple physical storage devices the ranges of the logical regions and the ranges of the physical regions are stored therein,
matching the specific physical region in the logical mapping with a corresponding logical region,
locating one or more additional logical regions that adjacently follow the corresponding logical region, and
identifying the additional physical regions corresponding to the one or more additional logical regions that adjacently follow the corresponding logical region;
conveying the second data including the additional physical regions to a cache; and
periodically updating the logical mapping using a background daemon to determine changes in the relationships between the logical regions of the logical volume and their corresponding physical regions, wherein the logical mapping is contained in a Volume Group Descriptor Area (VGDA), the VGDA stored in a beginning descriptor area of each of the multiple physical storage devices such that each respective one of the multiple physical storage devices contains a respective VGDA having the logical mapping between the logical regions of the logical volume stored on each respective one of the multiple physical storage devices and their corresponding physical regions;
wherein the storage device comprising the logical storage device having the multiple LUNs and multiple physical storage devices is selected from a list consisting of a hard disk drive and a solid state disk drive.

2. The method according to claim 1, and comprising retrieving the first data from the specific physical region, and conveying the first data to the host computer.

3. The method according to claim 1, and comprising retrieving the logical mapping from the storage device prior to receiving the storage command.

4. An apparatus, comprising:
a storage device; and
a processor configured to receive a storage command from a host computer to retrieve first data from a specific physical region of the storage device comprising a logical storage device having multiple logical unit numbers (LUNs) and multiple physical storage devices, to responsively retrieve second data being non-contiguous data from one or more additional physical regions of the multiple LUNs of an additional one of the multiple physical storage devices, physically non-adjacent to the first data such that the one or more additional physical regions are retrieved from a different physical storage device and partition than that storing the first data; wherein the first and second data are distributed on the multiple physical storage devices using block interleaving such that the first data and the second data each comprise the non-contiguous data; wherein the specific physical region and the one or more additional physical regions are combined into virtual regions, each of the virtual regions including a plurality of regions each comprising a sequence of bytes of a specific length of one megabyte, and each of the plurality of regions distributed among the multiple physical storage devices and previously concatenated or striped together to form a respective virtual region, and wherein the second data is responsively retrieved based on a logical mapping managed by the storage device and received prior to the storage command by the host computer, by:
    referencing the logical mapping, the logical mapping comprising relationships between logical regions of a logical volume and their corresponding physical regions; wherein the logical mapping contains a mapping of ranges of the logical regions which correspond to ranges of the physical regions and an indication of which of the multiple physical storage devices the ranges of the logical regions and the ranges of the physical regions are stored therein,
    matching the specific physical region in the logical mapping to a corresponding logical region,
    locating one or more additional logical regions that adjacently follow the corresponding logical region, and
    identifying the additional physical regions corresponding to the one or more additional logical regions that adjacently follow the corresponding logical region, wherein the processor is further configured to convey the second data including the additional physical regions to a cache, and periodically update the logical mapping using a background daemon to determine changes in the relationships between the logical regions of the logical volume and their corresponding physical regions, wherein the logical mapping is contained in a Volume Group Descriptor Area (VGDA), the VGDA stored in a beginning descriptor area of each of the multiple physical storage devices such that each respective one of the multiple physical storage devices contains a respective VGDA having the logical mapping between the logical regions of the logical volume stored on each respective one of the multiple physical storage devices and their corresponding physical regions; and further wherein the storage device comprising the logical storage device having the multiple LUNs and multiple physical storage devices is selected from a list consisting of a hard disk drive and a solid state disk drive.

5. The apparatus according to claim 4, wherein the processor is configured to retrieve the first data from the specific physical region, and to convey the first data to the host computer.

6. The apparatus according to claim 4, wherein the processor is configured to retrieve the logical mapping from the storage device prior to receiving the storage command.

7. A computer program product, the computer program product comprising:
    a non-transitory computer readable storage medium having computer readable program code embodied therewith, the computer readable program code comprising:
    computer readable program code configured to receive a storage command from a host computer to retrieve first data from a specific physical region of a storage device comprising a logical storage device having multiple logical unit numbers (LUNs) and multiple physical storage devices;
    computer readable program code configured to responsively retrieve second data being non-contiguous data from one or more additional physical regions of the multiple LUNs of an additional one of the multiple physical storage devices, physically non-adjacent to the first data such that the one or more additional physical regions are retrieved from a different physical storage device and partition than that storing the first data; wherein the first and second data are distributed on the multiple physical storage devices using block interleaving such that the first data and the second data each comprise the non-contiguous data; wherein the specific physical region and the one or more additional physical regions are combined into virtual regions, each of the virtual regions including a plurality of regions each comprising a sequence of bytes of a specific length of one megabyte, and each of the plurality of regions distributed among the multiple physical storage devices and previously concatenated or striped together to form a respective virtual region, and wherein the second data is responsively retrieved based on a logical mapping managed by the storage device and received prior to the storage command by the host computer, by:
    referencing the logical mapping, the logical mapping comprising relationships between logical regions of a logical volume and their corresponding physical regions; wherein the logical mapping contains a mapping of ranges of the logical regions which correspond to ranges of the physical regions and an indication of which of the multiple physical storage devices the ranges of the logical regions and the ranges of the physical regions are stored therein,
    matching the specific physical region to a corresponding logical region,
    locating one or more additional logical regions that adjacently follow the corresponding logical region, and
    identifying the additional physical regions corresponding to the one or more additional logical regions that adjacently follow the corresponding logical region;
    computer readable program code configured to convey the second data including the additional physical regions to a cache; and
    computer readable program code configured to periodically update the logical mapping using a background daemon to determine changes in the relationships between the logical regions of the logical volume and their corresponding physical regions, wherein the logical mapping is contained in a Volume Group Descriptor Area (VGDA), the VGDA stored in a beginning descriptor area of each of the multiple physical storage devices such that each respective one of the multiple physical storage devices contains a respective VGDA having the logical mapping between the logical regions of the logical volume stored on each respective one of the multiple physical storage devices and their corresponding physical regions;
    wherein the storage device comprises a logical storage device comprising the logical storage device having the multiple LUNs and multiple physical storage devices is selected from a list consisting of a hard disk drive and a solid state disk drive.

\* \* \* \* \*